(12) United States Patent
Zamkov

(10) Patent No.: US 10,837,910 B2
(45) Date of Patent: Nov. 17, 2020

(54) SHAPED-EXCITATION FLUORESCENCE (SEF) MICROSCOPY

(71) Applicant: Bowling Green State University, Bowling Green, OH (US)

(72) Inventor: Mikhail Zamkov, Bowling Green, OH (US)

(73) Assignee: Bowling Green State University, Bowling Green, OH (US)

(*) Notice: Subject to any disclaimer, the term of this patent is extended or adjusted under 35 U.S.C. 154(b) by 0 days.

(21) Appl. No.: 16/245,241

(22) Filed: Jan. 10, 2019

(65) Prior Publication Data

US 2019/0212271 A1 Jul. 11, 2019

Related U.S. Application Data

(60) Provisional application No. 62/615,633, filed on Jan. 10, 2018.

(51) Int. Cl.
*G01N 21/64* (2006.01)
*G02B 21/16* (2006.01)

(52) U.S. Cl.
CPC ....... *G01N 21/6458* (2013.01); *G01N 21/648* (2013.01); *G01N 21/6428* (2013.01); *G01N 21/6447* (2013.01); *G02B 21/16* (2013.01); *G01N 2021/6417* (2013.01); *G01N 2021/6439* (2013.01); *G01N 2021/6441* (2013.01); *G01N 2021/6471* (2013.01)

(58) Field of Classification Search
CPC ............ G01N 21/6258; G01N 21/648; G01N 21/6447; G01N 21/6428; G01N 2021/6441; G01N 2021/6217; G01N 2021/6439; G01N 2021/6271; G02B 21/16; G02B 5/201
See application file for complete search history.

(56) References Cited

U.S. PATENT DOCUMENTS 4,803,523 A * 2/1989 Pearson ............... G03F 3/04
355/32
2018/0011021 A1* 1/2018 Shoji ................... G01N 21/64

FOREIGN PATENT DOCUMENTS

WO WO-2016121189 A1 * 8/2016 ............. G01N 21/64

OTHER PUBLICATIONS

Razgoniaeva, N., Rogers, S., Moroz, P., Cassidy, J., Zamkov, M., Improving the Spectral Resolution in Fluorescence Microscopy through Shaped-Excitation Imaging, Methods and Applications in Fluorescence, Aug. 14, 2018, p. 045006, vol. 6, No. 4, IOP Publishing Ltd.

(Continued)

*Primary Examiner* — Kiho Kim
(74) *Attorney, Agent, or Firm* — MacMillan, Sobanski & Todd, LLC

(57) ABSTRACT

A method and apparatus for detecting more than one fluorophore in a sample. A broad spectrum excitation light is passed through a shaping filter before illuminating the target sample with more than one fluorophore to be detected, where the optical density of the shaping filter changes based on the wavelength of the broad-spectrum excitation light passing through it.

9 Claims, 11 Drawing Sheets
(11 of 11 Drawing Sheet(s) Filed in Color)

(56) References Cited

OTHER PUBLICATIONS

Han, J. and Burgess, K., Fluorescent Indicators for Intracellular pH, Chemical Reviews, 2010, pp. 2709-2728, vol. 110, No. 5, American Chemical Society.

Dean, K.M. and Palmer, A.E., Advances in fluorescence labeling strategies for dynamic cellular imaging, Nature Chemical Biology, Jul. 2014, pp. 512-523, vol. 10. No. 7, Nature Publishing Group.

* cited by examiner

SHAPED-EXCITATION FLUORESCENCE (SEF) MICROSCOPY

CROSS-REFERENCE TO RELATED APPLICATIONS

This application is claiming the benefit, under 35 U.S.C. § 119(e), of the provisional application filed on Jan. 10, 2018, under 35 U.S.C. § 111(b), which was granted Ser. No. 62/615,633, and is hereby incorporated by reference in its entirety.

STATEMENT REGARDING FEDERALLY SPONSORED RESEARCH OR DEVELOPMENT

This invention was made with government support under DE-SC0016872 awarded by U.S. Department of Energy, Office of Science. The government has certain rights in the invention.

BACKGROUND OF THE INVENTION

The visualization of distinct molecular species represents an important challenge of bio-imaging research. In past decades, the development of multicolor fluorescent (FL) labels has greatly improved our ability to track biological analytes, paving the way for important advances in understanding the cell dynamics. It remains challenging, however, to visualize a large number of different fluorephores simultaneously. Owing to a spectrally broad absorption of fluorescent dyes, only up to five color categories can be resolved at once. Here, we demonstrate a general strategy for distinguishing between multiple fluorescent targets in acquired microscopy images with improved accuracy. The present strategy is enabled through spectral shaping of the excitation light with an optical filter that uniquely attenuates the light absorption of each fluorophore in the investigated sample. The resulting emission changes, induced by such excitation modulation, are therefore target-specific and can be used for identifying various fluorescent species. The technique is demonstrated through an accurate identification of 8 different CdSe dyes with absorption maxima spanning the 520-620 spectral range. It is subsequently applied for accurate measurements of the pH balance in buffers emulating a metabolism of tumor cells.

SUMMARY OF THE INVENTION

Disclosed herein is a method for detecting more than one fluorophore in a sample, including providing a broad-spectrum excitation light for excitation of the more than one fluorophore in the sample, passing the broad-spectrum excitation light through a shaping filter, thereby producing a filtered excitation light, illuminating the sample with the filtered excitation light, thereby exciting the more than one fluorophore in the sample, and detecting an emission light from the more than one fluorophore in the sample Also disclosed herein is an apparatus for detecting more than one fluorophore in a sample, including the sample with more than one fluorophore to be detected, an excitation light source that provides a broad-spectrum excitation light for excitation of the more than one fluorophore in the sample, a shaping filter between the excitation light source and the sample, and a detector for detecting an emission light from the more than one fluorophore in the sample.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

Multicolor FL imaging techniques have greatly improved our understanding of biological systems.[1-6] The employment of molecule-specific labeling has allowed visualizing the structure and dynamics of various molecular species inside a live sample in real time. These methodologies have paved the way for important advances in understanding such biological-processes as protein diffusion and trafficking[7-9], conformational changes[10-15], profiling RNA[16], protein-protein interactions[17-20], and metabolic pathways.[21-22] Despite continuous efforts devoted to improving optical properties of fluorescent labels, the absorption profiles of most dye molecules are fairly broad. The presence of multiple shades of color in the extinction spectra of commonly used FL dyes (e.g. Cyanine, Alexa, fluorescent proteins) makes it difficult to distinguish these fluorophores in multi-color imaging experiments. Unless special imaging techniques are employed[16,23-24,] only up to 5 different types of dyes can be imaged simultaneously.[25] A simple strategy for identifying a larger number of molecular species in an acquired FL image is therefore needed to avail the structural and functional characterization of complex macromolecules providing deeper insights into the molecular dynamics of living cells.

Here, we demonstrate the shaped-excitation fluorescence (SEF) microscopy technique for distinguishing between different types of fluorophores in the FL image. The developed approach is enabled through spectral shaping of the broad band excitation light with an optical filter that induces unique changes in the excited state population of each target specie within the sample. As a result, different fluorophores can be distinguished in the acquired image based on their a priori predicted emission modulation. In this work, the technique is demonstrated by distinguishing between 8 different dyes featuring 80-95% neighbor-to-neighbor absorption overlap, which were simultaneously introduced into a flow cell. The molecular recognition ability of SEF was subsequently employed for measuring the pH balance in FL images of aqueous fluorescein solutions with a ±0.1 accuracy.

Figure 1:
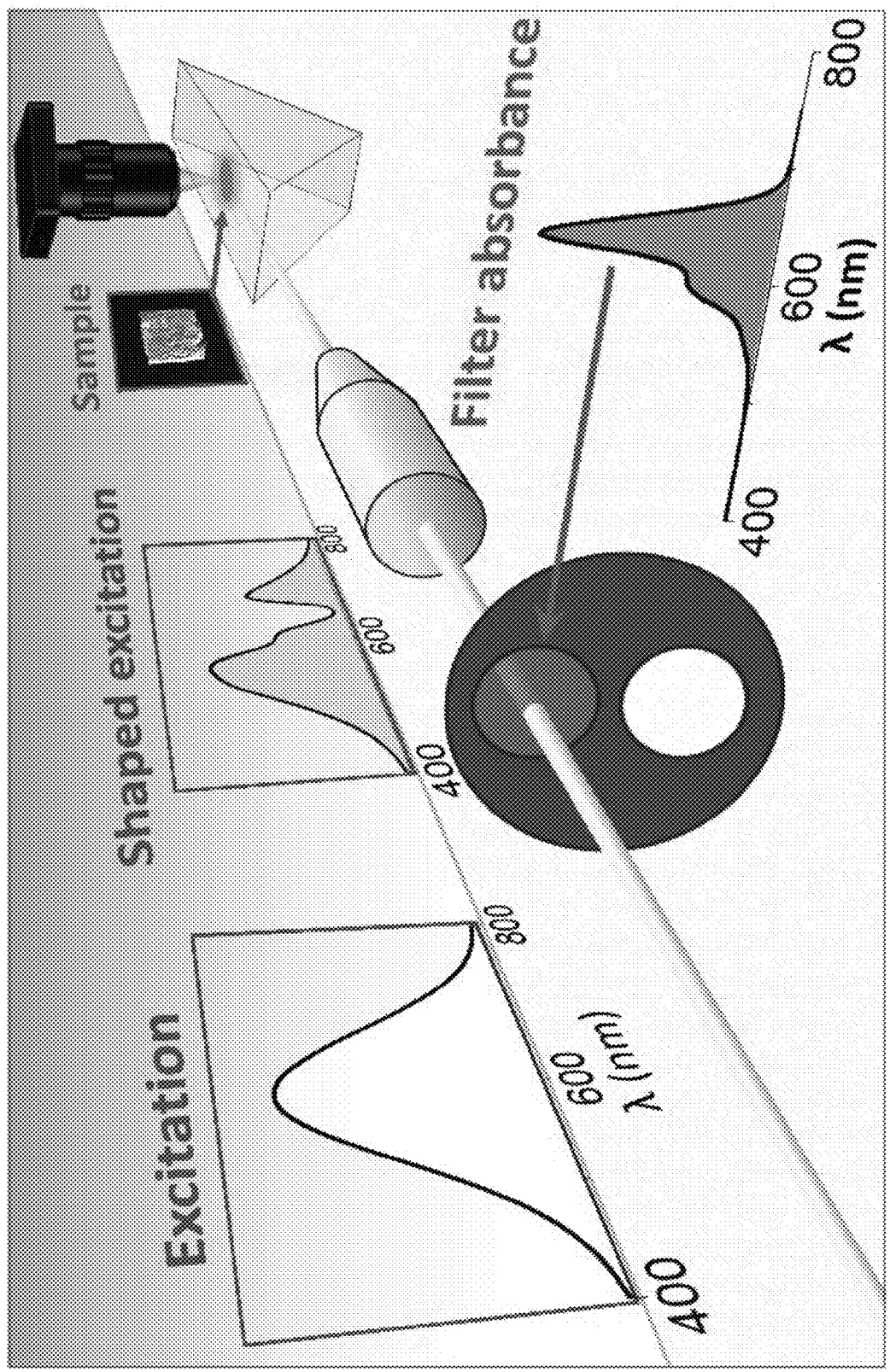
FIG. 1 shows a schematic of the microscopy set-up in accordance with an embodiment of the invention.

FIG. 1 shows an illustration of the shaped-excitation fluorescence (SEF) microscopy approach for resolving the spectral crosstalk between multiple fluorophores in the FL image. Targeted dyes are identified based on the predicted suppression of their emission resulting from the application of the excitation filter.

Methods

Chemicals. Acetone (ACS, Amresco), cadmium (II) oxide (CdO, 99.99%, Aldrich), chloroform (anhydrous, 95%, Aldrich), ethanol (anhydrous, 95%, Aldrich), 1-octadecene (ODE, tech., 90%, Aldrich), n-octadecylphosphonic acid (ODPA, 98%, PCI Synthesis), sulfur (S, 99.999%, Acros), stearic acid (SA, 97%, Acros), selenium powder (200 mesh, Acros), tributylphosphine (TBP, 97%, Aldrich), tri-n-octylphosphine (TOP, 97%, Strem), tri-n-octylphosphine oxide (TOPO, 99%, Aldrich), octadecylamine (ODA, tech., 90% Acros), potassium phosphate monobasic anhydrous ($KH_2PO_4$, Amresco), potassium phosphate dibasic ($KH_2PO_4$, J. T. Baker), fluorescein (Aldrich), Cy5 (Lumiprobe), Alexa488 (Lumiprobe). All reactions were performed under argon atmosphere using the standard Schlenk technique. The centrifuge used for precipitation operated at 5400 and 7200 rpm.

Synthesis of CdSe nanocrystals with $\lambda_{exciton}$=522 nm-554 nm. CdSe nanocrystals (NCs) were synthesized according to a procedure adapted from reference number 26. Briefly, TOP (3.0 g), ODPA (0.280 g), and CdO (0.060 g) were mixed in a 50 mL flask, heated to ca. 150° C. and exposed to vacuum for 1 hour. Then, under argon, the solution was heated to above 300° C. to dissolve CdO until the mixture turned optically clear and colorless. At this point, 1.5 g of TOP was injected into the flask and the temperature was raised to 380° C. The reaction flask with Cd precursor was raised up from the heating mantle right before the injection of Se precursor to get small-diameter nanoparticles. A selenium precursor prepared by dissolving 0.058 g of Se in 0.43 mL of TOP through heating to 150° C. under argon and cooling to room temperature was injected all at once into the raised flask (at 360° C.). After the synthesis, nanocrystals were precipitated with ethanol, and washed by repeated redissolution in chloroform and precipitation with the addition of ethanol. Finally, the product was stored in chloroform (3 ml).

Synthesis of CdSe nanocrystals with $\lambda_{exciton}$=560 nm-623 nm. CdSe NCs were grown using a previously reported technique described in reference number 27. In a three-neck flask, stearic acid (0.67 g), ODE (7.1 mL), and CdO (0.078 g) were heated to 200° C. under argon atmosphere until the solution turns clear indicating the formation of cadmium stearate. Then the reaction mixture was allowed to cool to room temperature (RT) at which point 4.5 g ODA and 1.5 g TOPO were added. The flask was reheated to 280° C. under vigorous stirring and selenium solution, prepared under argon by dissolving 0.461 g of selenium powder via sonication in TBP (2 mL) and further diluting it with 5.2 mL of ODE, was quickly injected. The temperature was set at 250° C. and the reaction continued until the desired size of the NPs was reached, at which point the reaction was quenched by removing the flask from the heating mantle. Once the flask's contents had cooled to 60° C., chloroform (10 mL) was injected into the flask to prevent solidification. To remove the unreacted material the contents of the flask were centrifuged and the precipitate was discarded. Acetone (6 mL) was added to the supernatant, and the solution was centrifuged again. The final precipitate was stored in chloroform (3 ml).

pH measurements. Buffer solutions that were used for a pH sensing test contain 0.2M $KH_2PO_4$+0.2M $KH_2PO_4$ for pH 5.6-6.5. Fluorescein was dissolved in buffer solutions of different pH, and the concentration of the dye was adjusted to ~30 mM.

Results and Discussion

Figure 2A:
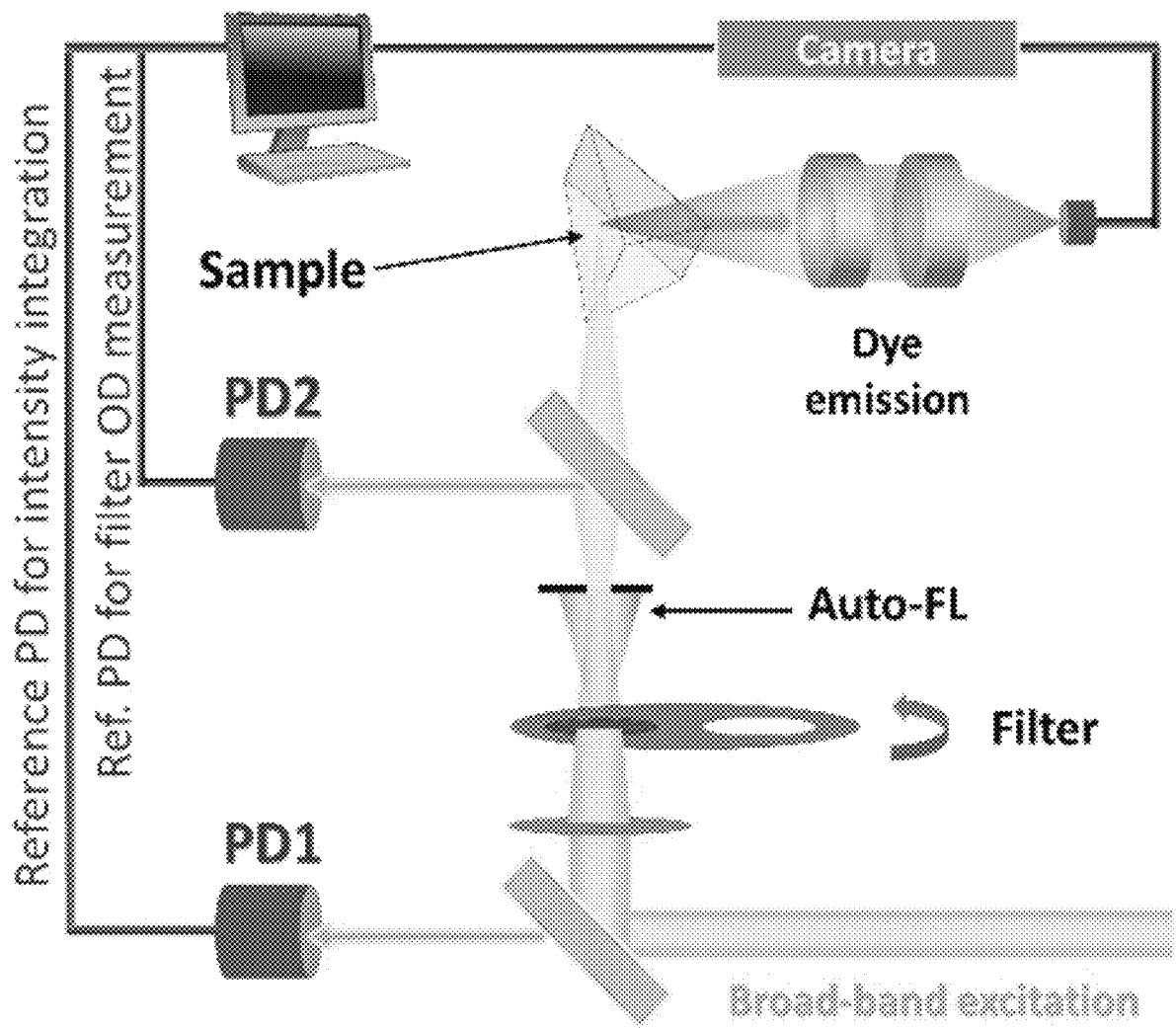
FIG. 2A shows a schematic of the procedure for shaped-excitation fluorescence (SEF) measurements in accordance with embodiments of the invention.
Figure 2B:
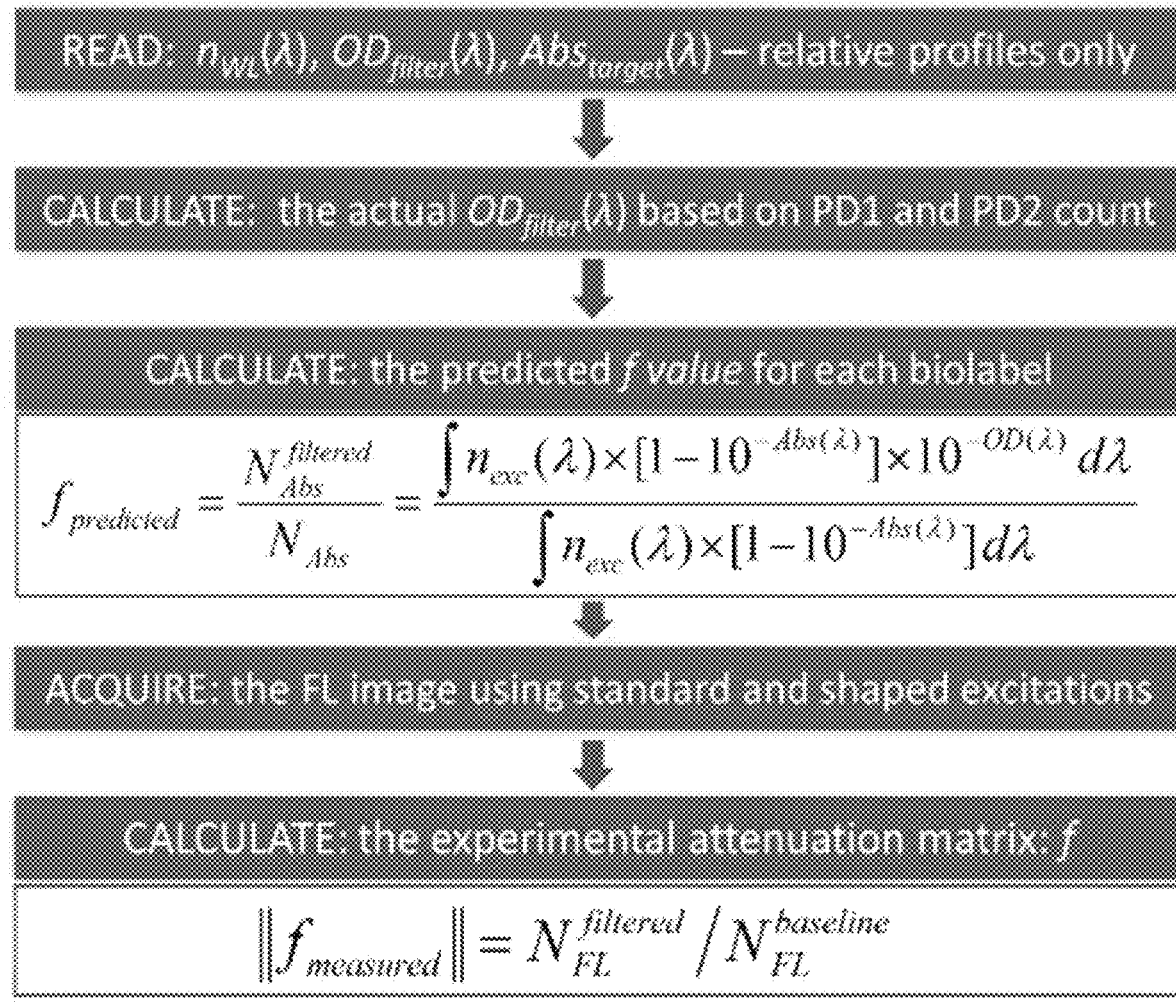
FIG. 2B shows a diagram of the procedure for shaped-excitation fluorescence (SEF) measurements in accordance with embodiments of the invention.

FIG. 2A shows the schematic of the experimental setup for SEF measurements. FIG. 2B shows a diagram explaining the steps for determining predicted and measured attenuation ratios, $f_{theor}$ and $f_{exp}$. The light from the broad band source (e.g., halogen lamp) is used for excitation. A reference photodiode (PD1) integrates the photon flux emitted by the lamp during each measurement in order to exclude any fluorescence ($N^{FL}$) variations due to excitation intensity changes. The second photodiode (PD2) samples the excitation beam after it passes through the filter solution. The PD2 count is used to calculate the OD of an excitation filter in situ, which helps reducing the experimental error associated with inhomogeneous mixing of the filter solution. The fluorescence of the targeted dye, $N^{FL}$, is detected using a microscope objective coupled to a CCD camera. The integrated fluorescence count is normalized based on the corresponding level of the photon count received by the PD1 reference photodiode.

After passing the shaping filter, the excitation light was fiber-coupled to a prism for a total internal reflection fluorescence (TIRF) configuration. The evanescent-wave excitation of the sample was achieved within a 200-nm layer above the cover slip. The resulting fluorescence signal was collected using a home build microscope equipped with a 100× Mitutoyo Plan Apo 0.7 NA air objective (f=2 mm). The image was acquired using a f=50 mm camera lens coupled to a 640×480 Pixel (VGA) Monochrome CCD Sensor. The effect of Rayleigh scattering was estimated to be within 10% of the dye emission intensity and was partly removed by taking the ratio of attenuated to non-attenuated image intensities (f-ratio, Eq. 3). Indeed, if R represents the intensity of the scattered light then the attenuation fraction, f, is given as f=(I'+R)/(I+R), where I' and I are the intensities of the attenuated and non-attenuated emission of the dye, respectively. Notably, the uncertainty in the determination of f falls below 1% if R<5%. The quartz flow cell was 3 mm thick (an external dimension) and 25 mm long. For the flow cell measurements using the TIRF configuration, the incident beam was coupled to the surface of the cell using a Pellin Broca prism.

The SEF approach for identifying targeted fluorophores in the FL image exploits the unique response of different molecular species to spectral shaping of the excitation light. This strategy was previously explored towards tracking the energy flow in fluorescent dyes[28,29] (without imaging capabilities). Based on excitation shaping formalism, the emission intensity of a given fluorophore is proportional to the number of absorbed photons, $N_{Abs}:N_{FL}$, where QY x $N_{Abs}$ is the emission quantum yield. Consequently, one can modulate the value of $N_{Abs}$ to yield predictable changes in $N_{FL}$. For samples with a negligible re-absorption, $N_{Abs}$ can be expressed as a function of the excitation spectral profile, $n_{exc}(\lambda)$:

$$N_{Abs} = \int n_{exc}(\lambda) \times [1-10^{-Abs(\lambda)}] d\lambda \quad (1)$$

where $Abs(\lambda)$ is the absorbance of the targeted fluorophore in the sample. Shaping the excitation light with an optical filter of a known optical density $OD(\lambda)$ leads to the reduction in the number of photons absorbed by the fluorophore, such that:

$$N_{Abs}^{filtered} = \int n_{exc}(\lambda) \times [1-10^{-Abs(\lambda)}] \times 10^{-OD(\lambda)} d\lambda \quad (2)$$

The drop in the FL intensity associated with shaping of the excitation light, $$f = N_{Abs}^{filtered}/N_{Abs} \quad (3)$$

is therefore unique for each of the investigated fluorophores in the sample, provided that the absorbance of the excitation filter is wavelength dependent. Along these lines, the value of f can be predicted for each type of the fluorescent molecules in the sample based on the known spectral shape of the excitation light, $n_{exc}(\lambda)$, and its absorption profile, $Abs(\lambda)$. These fluorophores can then be identified in the acquired image by comparing the predicted image attenuation, $f_{theor} = N_{Abs}^{filtered}/N_{Abs}$, with the observed intensity reduction, $f_{exp} = N_{FL}^{filtered}/N_{FL}$, where $N_{FL}^{filtered}$ and $N_{FL}$ are the recorded emission intensities corresponding to the shaped-excitation and baseline runs, respectively (see FIG. 2B).

Figure 3:
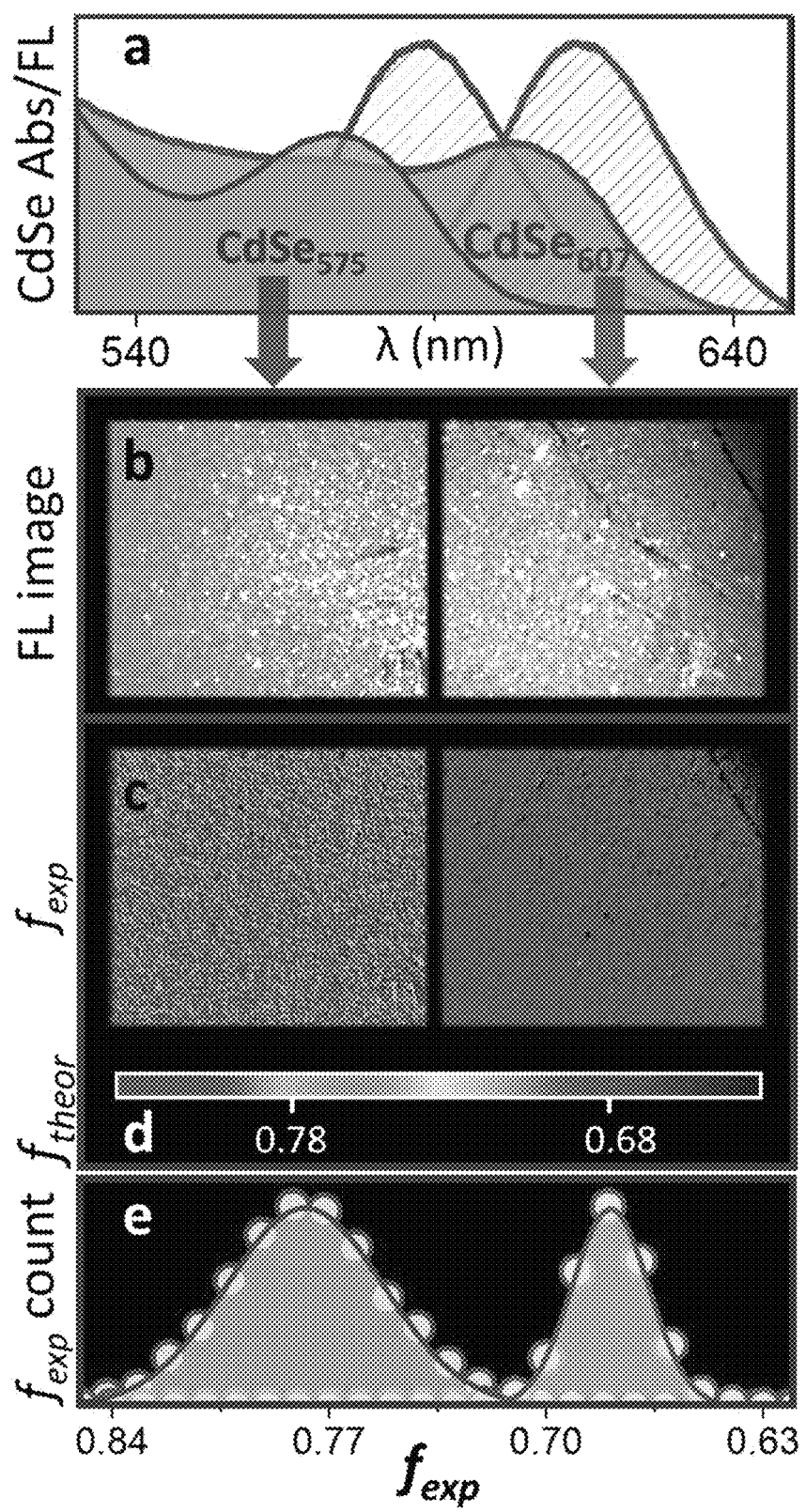
FIG. 3 shows an illustration is the SEF-based molecular recognition strategy for the case of two-dye target in accordance with an embodiment of the invention.
Figure 4:
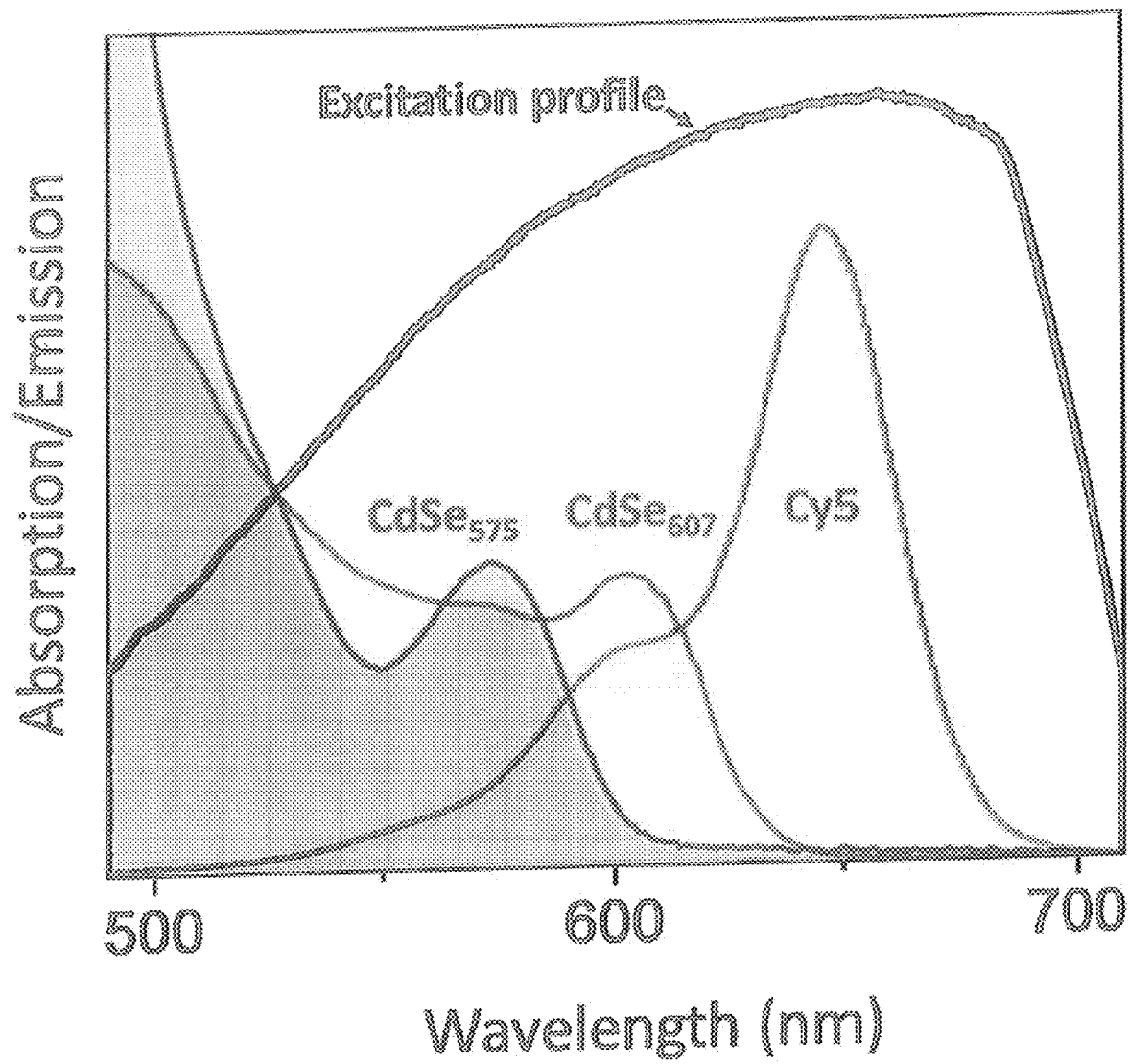
FIG. 4 shows the spectral profiles of the excitation light and Cy5 solution (excitation filter) used in two-fluorophore imaging in accordance with an embodiment of the invention. The absorption profiles of the two CdSe fluorophores as used in accordance with an embodiment of the invention are also shown.

The SEF-based recognition of targeted dyes in a FL image was first demonstrated using a two-dye model system comprising CdSe quantum dot (QD) stains (FIG. 3). To this end, a two-color target was prepared by means of a lithographic deposition of orange ($\lambda_{Abs}$=575 nm) and red ($\lambda_{Abs}$=607 nm) emitting CdSe nanoparticles into two square regions on top of the microscope cover slip. The associated spectral overlap in the excitation range was estimated at 74%. The FL image of this target was obtained using a total internal reflection geometry designed to prevent the direct imaging of excitation photons. The spectral profile of the halogen excitation source exhibited a significant overlap with absorption features of both CdSe fluorophores, as shown in FIG. 4.

FIG. 3 is an illustration of the SEF-based molecular recognition strategy for the case of a two-dye target. FIG. 3A shows absorption profiles of the two CdSe fluorophores ($CdSe_{575}$ and $CdSe_{607}$) used for labelling the two square areas of the sample. FIG. 3B is an FL image of the two stained areas acquired using a dry objective (N.A.=0.20). FIG. 3C shows the color-scale map of the FL attenuation fraction, $f_{exp}$, reconstructed from the FL image by taking a ratio of FL intensities obtained with and without the excitation filter (Cy5) using Eq. 3. FIG. 3D shows the color scale for mapping f that shows the two predicted attenuation fractions for the two CdSe samples: $f_{theor}(CdSe_{575})$ and $f_{theor}(CdSe_{607})$. FIG. 3E shows the statistical distributions of $f_{exp}$ for the two CdSe sample areas.

Figure 5:
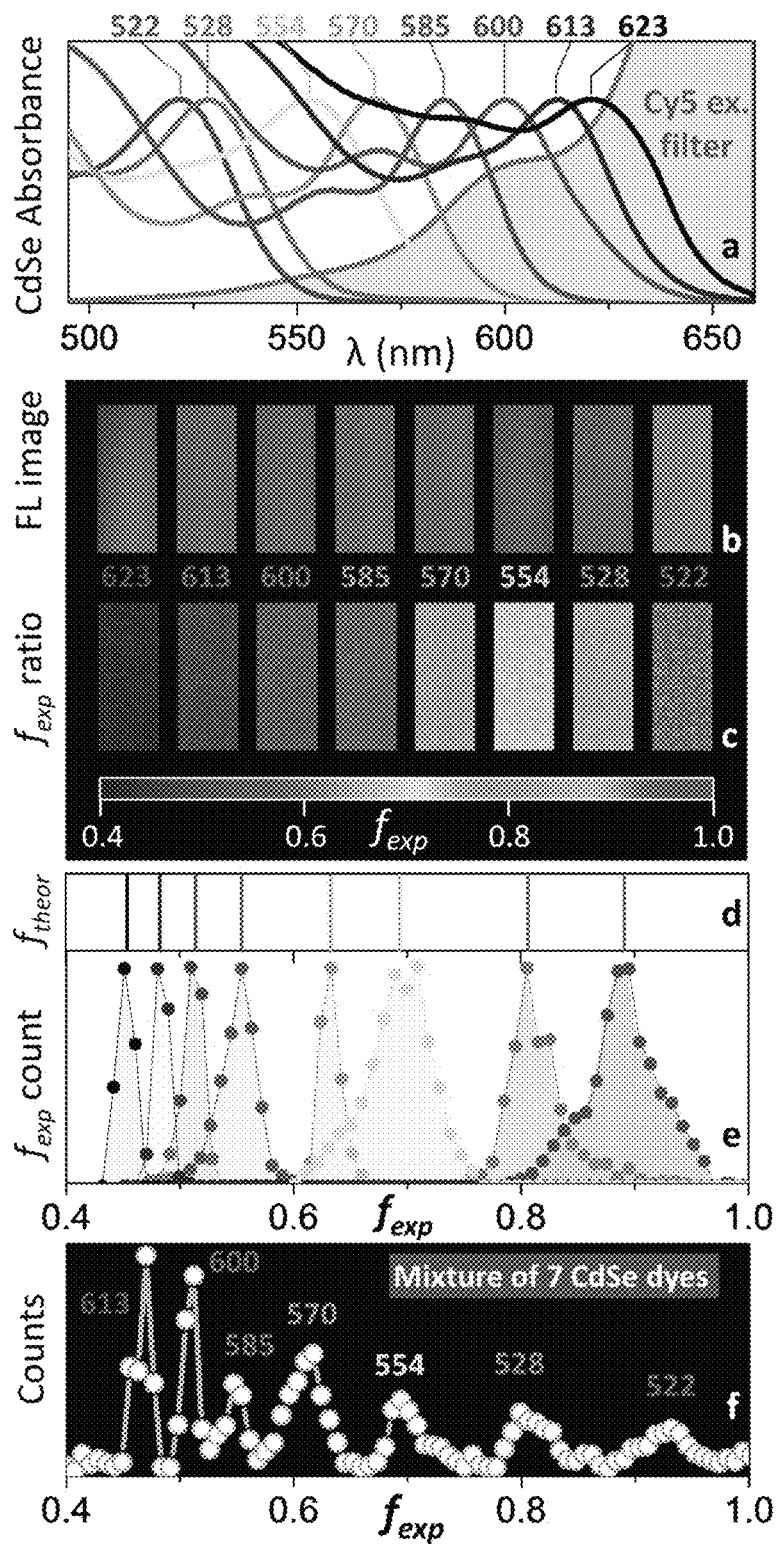
FIG. 5 shows results using an 8-dye target (top 3 panels) as well as a mixture of 7 dyes (bottom panel) in accordance with embodiments of the invention.
Figure 6:
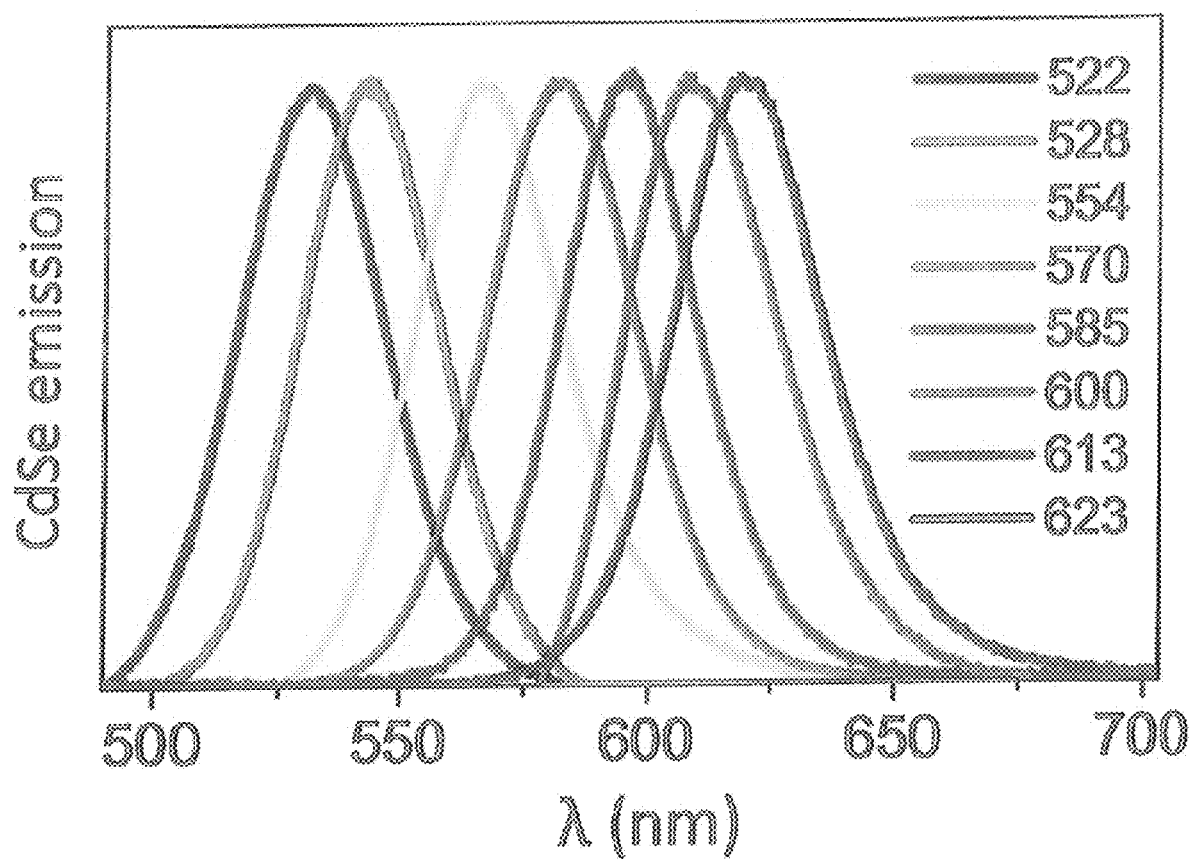
FIG. 6 shows the emission profiles of 8 CdSe4 quantum dot (QD) used in embodiments of the invention.

To distinguish between the two fluorophores in the FL image, the excitation beam was spectrally shaped using a solution of a Cy5 dye exhibiting different optical densities at absorption maxima of the two CdSe samples, $\lambda_1$=575 nm and $\lambda_2$=607 nm. Under these conditions, the application of the Cy5 excitation filter (OD=0.98) was expected to attenuate the emission of the $CdSe_{575}$ QD stain by a factor of $f_{theor}$=0.78 while the emission of the $CdSe_{607}$ region would be reduced by a factor of $f_{theor}$=0.68 (FIG. 3D). Accordingly, the FL image acquired under the shaped excitation conditions (FIG. 3B) was compared to the baseline run (no shaping) and the reduction in the emission count corresponding to each pixel was used to create an attenuation ratio map (contour plots of $f_{exp}$ in FIG. 3C). A side-by-side comparison of the two reconstructed $f_{exp}$ images in FIG. 3C attests to the significant difference between attenuations of the two target regions, which is also evident from the corresponding statistical distributions of $f_{exp}$ that show well separated sets of values centered at $f_{exp}(CdSe_{607})$=0.678 and $f_{exp}(CdSe_{575})$=0.777. The two experimental attenuation ratios appear to agree well with the predicted FL attenuations: $f_{theor}(CdSe_{607})$=0.682 and $f_{theor}(CdSe_{575})$=0.781. Consequently, we conclude that the two CdSe QD species were successfully distinguished in the FL image. The molecular recognition capabilities of SEF were further explored by identifying 8 different fluorophores in the acquired FL image. For this purpose, we have selected eight ascending-diameter CdSe QD samples with corresponding excitonic absorption features spanning the $\lambda$=522-623 nm spectral range (FIG. 5A and FIG. 6). Owing to the spectral proximity of selected fluorophores featuring the ~80-95% excitation overlap between nearest shades, the investigated set was expected to provide a feasible challenge for testing the SEF spectral resolution capabilities. The eight QD samples were sequentially introduced into a flow cell (as illustrated in FIG. 7D) and the corresponding FL images were recorded with and without excitation shaping. A solution of Cy5 dye (OD=3.1) was once again employed as an excitation filter due to the strongly varying optical density of this molecule across the investigated spectral range. According to FIG. 5D, the expected FL attenuation values, $f_{theor}$, associated with 8 CdSe samples were expected to be sufficiently different. Overall, the flow cell measurements for 8 CdSe dyes were performed 5 times. On every run it was possible to clearly distinguish eight different f-values corresponding to each dye. The data shown in FIG. 5e represents the run featuring the lowest dispersion of individual f-values, meanwhile the average $f_{exp}$ count corresponding to the other 4 runs is shown in FIG. 8. FIG. 8 shows an illustration of the run-to-run experimental uncertainties. FIG. 8A shows the $f_{exp}$ distribution obtained in the best run (FIG. 5E). FIG. 8B shows the average $f_{exp}$ count of the 4 other runs performed using the same CdSe nanocrystal solutions.

FIG. 5A shows the absorbance profiles of 8 CdSe quantum dot samples spanning the 522-623 nm range. The absorption profile of the excitation filter (Cy5, shaded area) exhibits a ramp-like increase in the optical density across the investigated spectral range, which is designed to induce different degrees of the emission attenuation (f) in each of investigated CdSe dyes. FIG. 5B shows FL images of CdSe solutions sequentially introduced into a flow cell. FIG. 5C shows the corresponding attenuation ratios for each specimen, obtained by taking the ratio of the Cy5-filtered image matrix to the baseline run (no filter) image matrix. The resulting $f_{exp}$ pixel maps were indexed to the full-spectrum color scale. FIG. 5D shows predicted values of attenuation, $f_{theor}$, calculated using step 3 in FIG. 2b FIG. 5E shows the statistical distributions of $f_{exp}$ for each of 8 CdSe quantum dot samples. FIG. 5F shows the distribution of $f_{exp}$ associated with the FL image of a 7-dye sample. All CdSe dyes were introduced into a flow cell simultaneously at similar concentrations. OD≈3 Cy5 excitation filter was used for FL attenuation.

The FL images of ascending-diameter CdSe samples acquired using the total internal reflection geometry are shown in FIG. 5B. Rather than targeting the emission of single molecules, the current setup was aimed at achieving a uniform brightness across the image, making the 8 acquired pixel maps nearly identical. The corresponding attenuation plots ($f_{exp}$) were then reconstructed by taking the ratio of the Cy5-filtered image matrix to the baseline run (no-filter) image matrix (FIG. 5C). The resulting values of $f_{exp}$ were indexed to the full-range color scale, which allowed visualizing the differences in $f_{exp}$ for each CdSe dye. The corresponding statistical distributions of $f_{exp}$ for 8 CdSe samples were compared in FIG. 5E, which shows a clear separation between attenuations of investigated specimens. The ability to separate 8 different $f_{exp}$ values was confirmed using several runs. The data shown in FIG. 5E represents the run featuring the lowest dispersion of individual $f_{exp}$. Based on estimated standard deviations associated with observed f-values, we conclude that any combination of investigated CdSe dyes can be simultaneously imaged using their expected f-values. This premise was confirmed by imaging a combined sample of 7 CdSe dyes introduced simultaneously into a flow cell. A $CdSe_{623}$ dye was purposefully excluded from the combination to provide a reference count level. According to FIG. 5F, the statistical distribution of $f_{exp}$ in this case reveals 7 distinct peaks, which could be readily mapped to specific types of CdSe QDs.

The spectral sensitivity of SEF microscopy appears to compare favorably with the standard multi-color FL imaging methods relying on laser/filter combinations. For instance, in the case of investigated CdSe dyes in FIG. 5A, at most 4 can be simultaneously distinguished in the 520-620 nm range using an optimal combination of short-pass, bandpass, and long pass emission filters (see FIG. 9 for the comparison of Cy5 and notch-type excitation filters).

Figure 9:
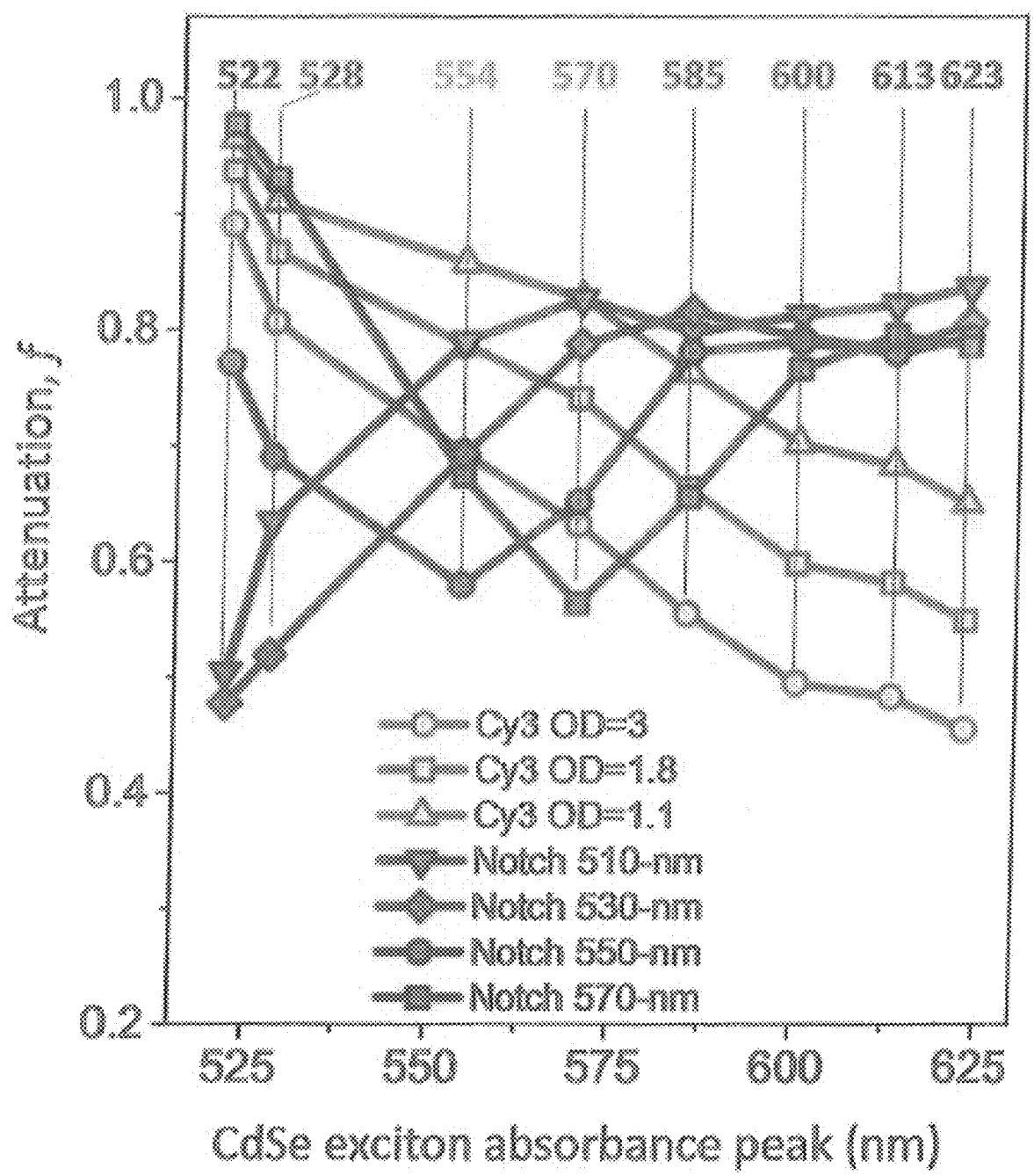
FIG. 9 shows a comparison of Cy5 excitation filters featuring three optical densities with several notch filters at a bandwidth if 40 nm in accordance with an embodiment of the invention.

FIG. 9 shows a comparison of Cy5 excitation filters (featuring three different optical densities) with several notch filters (bandwidth=40 nm). The attenuation ratio for the 8 investigated CdSe dyes (see FIG. 5) was simulated based on the known filter optical density and the absorbance profile of each dye. The simulated values of f are plotted for each CdSe species. The best performing notch filter (center=570 nm) can resolve up to 4 different colors. The Cy5 filter can be used to resolve all 8 shades.

Meanwhile, the SEF approach enables the recognition of 8 CdSe shades with an average false positive error of less 3.5%, which was determined using normal distributions of 8 populations. To this end, the difference between $f_{exp}$ values of the two spectrally-adjacent dyes for all pairs was divided by the standard deviation resulting in the t-value. The probability of rejecting the null hypothesis (no difference) was then estimated from the corresponding p-value. Notably, the degree of dye photobleaching in SEF measurements is expected to be reduced in comparison with spectral scanning techniques (e.g. lambda stack) where sequential acquisitions of the emission from the same dye in response to different spectral masks are typically required.[30]

The sensitivity of SEF microscopy to small changes in the dye absorption profile offers exciting prospects for visualizing various processes in living cells. Among those, the ability to measure the acidity of the cell environments using pH sensitive fluorophores, such as fluorescein, is in great demand.[31,32] The challenge lies in identifying small changes in the fluorescein absorbance induced by minor variations in the surrounding pH level, which are difficult to discern directly from the FL image. In this case, the employment of the SEF technique, which is particularly sensitive to changes in the derivative of the Abs($\lambda$), can offer a viable solution.

Figure 7:
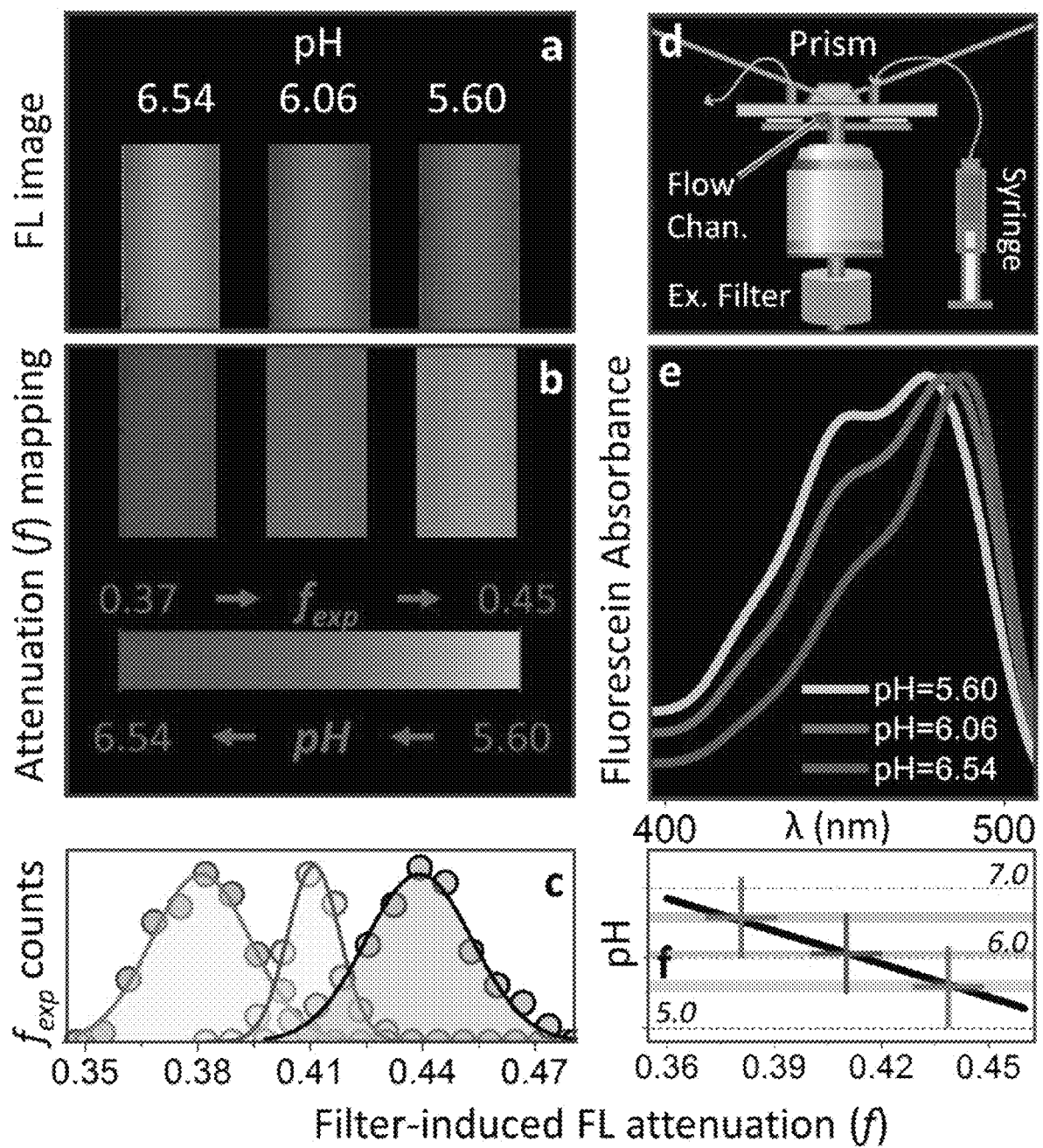
FIG. 7 shows SEF measurements of the pH level in aqueous media in accordance with an embodiment of the invention.
Figure 8:
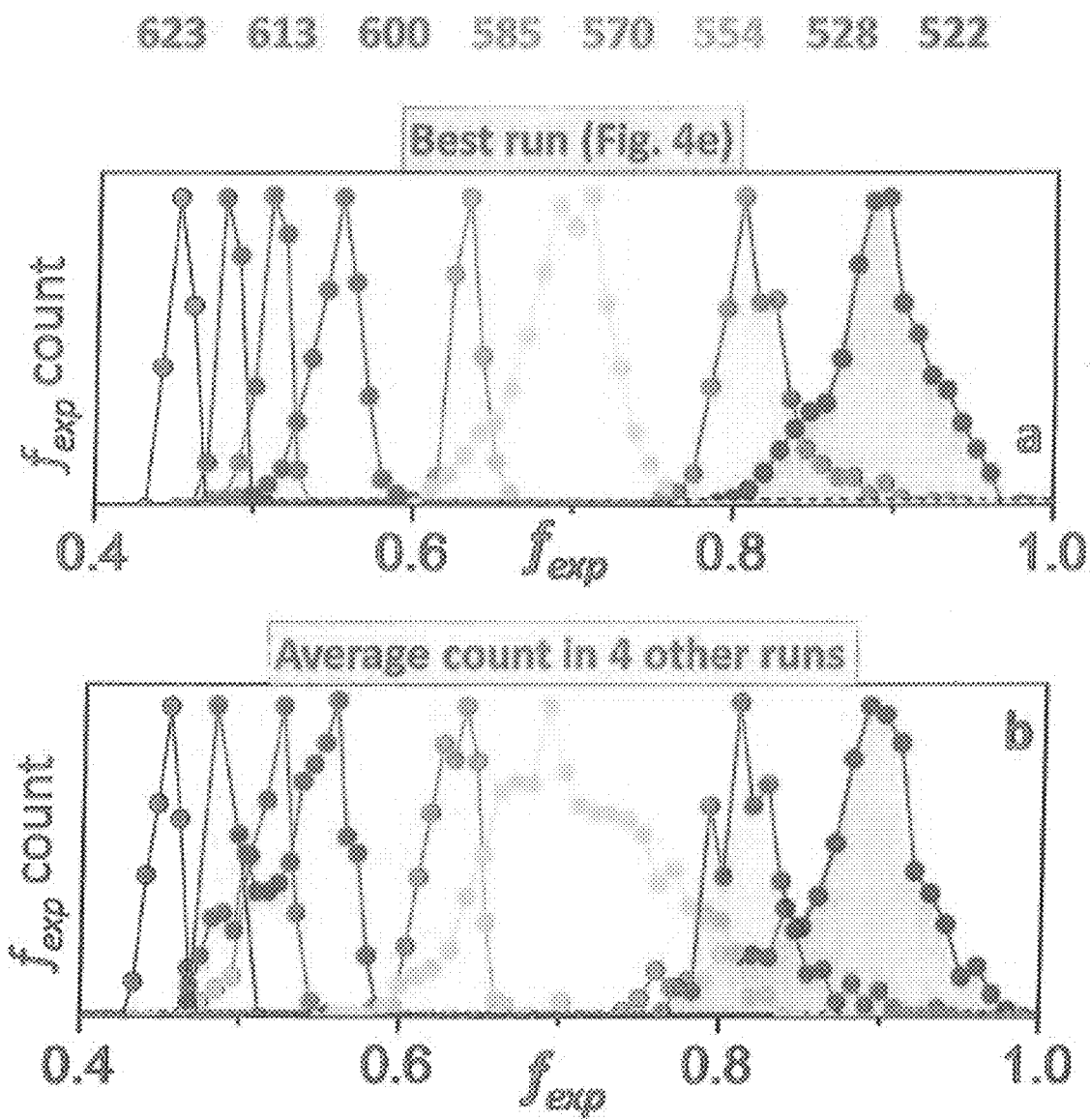
FIG. 8 shows an illustration of the run-to-run experimental uncertainties.

FIG. 7 shows SEF measurements of the pH level in aqueous media. FIG. 7A shows images of the fluorescein solution acquired using a total internal reflection fluorescence microscopy (dry obj. N.A.=0.20). The three specimens were prepared using acidic buffers with corresponding pH levels of 6.54, 6.06, 5.60. FIG. 7B shows attenuation ratios ($f_{exp}$) calculated by taking the ratio of fluorescein intensities with and without the excitation filter (Alexa488 dye). FIG. 7C shows the corresponding distributions of $f_{exp}$ values for each buffer inferred from the attenuation maps. FIG. 7D shows schematic of the flow cell imaging setup. FIG. 7E shows absorption profiles of the fluorescein dye at different pH levels. FIG. 7F shows expected (black curve) and measured (crosses) values of f corresponding to known acidity levels of the fluorescein buffer.

Figure 10:
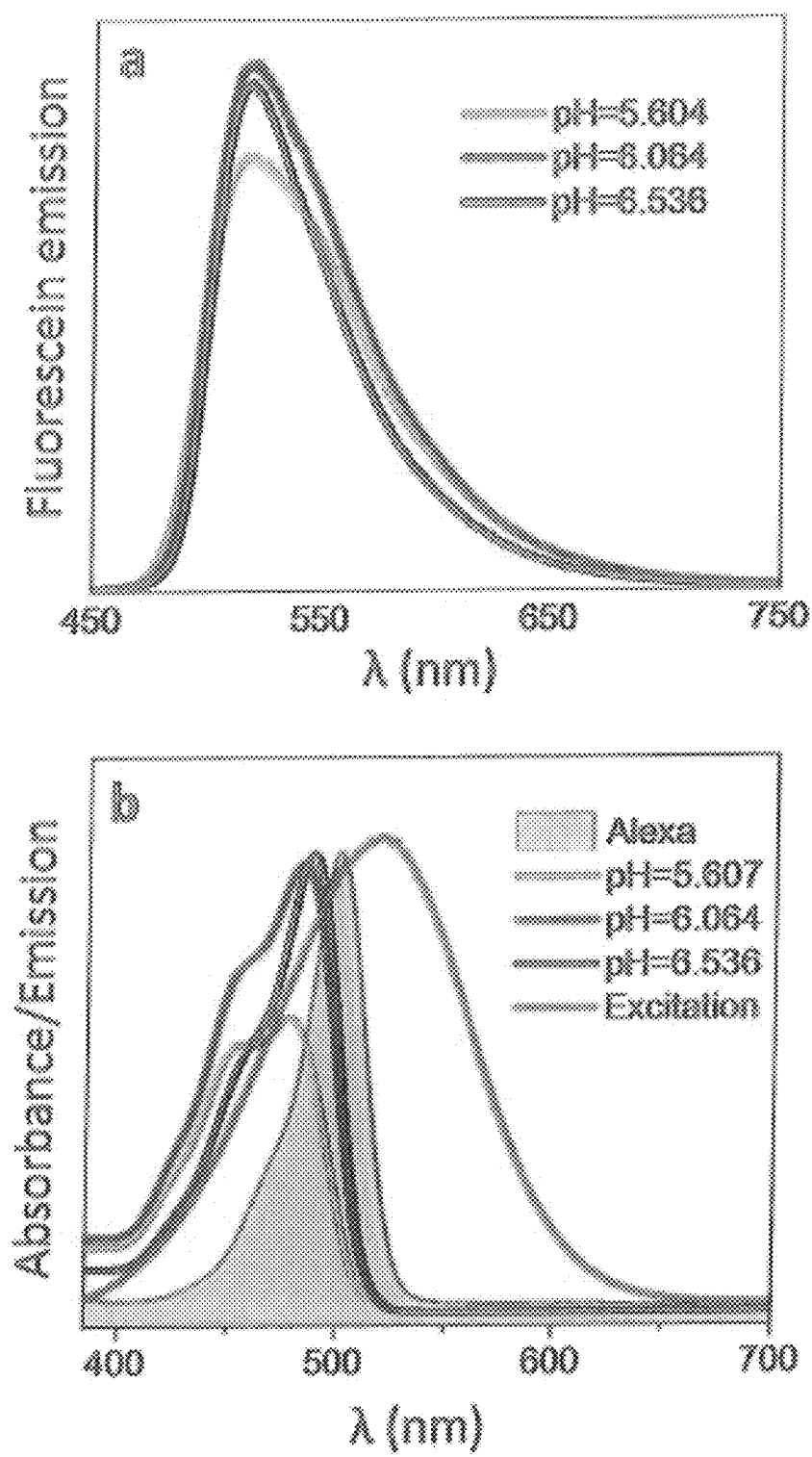
FIG. 10 shows emission and spectral profiles of dyes and filters at various pH levels, as used in accordance with embodiments of the invention.

Fluorescein dyes are known to exhibit characteristic pH-dependent absorption/emission spectra resulting from their intrinsic multistage protonated/deprotonated forms, as illustrated in FIG. 7E and FIG. 10.[33] FIG. 10A shows emission profiles of the fluorescein dye in acidic buffers. FIG. 10B shows spectral profiles of the excitation light and Alexa488 solution (excitation filter) used in the pH sensing experiment. The absorption profiles of fluorescein at different pH levels are also shown.

Since spectral variations in the fluorescein emission are usually too small to be inferred from changes in the FL profile (see FIG. 10A), the pH-level is obtained through the use of fluorescence-based ratiometric sensing where acidity variations are related to the FRET efficiency in QD/fluorescein conjugates.[34,35] The downside of such ratiometric approaches lies in the complex nature of FRET-based signaling requiring advanced assembly techniques.[36]

To mimic the extracellular environment, we have explored the pH-dependent changes of fluorescein absorbance associated with mildly acidic buffers. These pH ranges are known to emulate the metabolism of tumor cells (pH 6.0-6.9)[37], making the task of imaging such acidic cellular microenvironments of fundamental importance to detecting cancer. SEF measurements were performed on three buffers (pH1=5.6, pH2=6.06, and pH3=6.54) that were sequentially introduced into the flow cell. The FL image of fluorescein (FIG. 7A) in each case was first obtained without the application of the excitation filter to create the baseline image for each sample. Subsequently, a filter cuvette containing an Alexa488 dye solution (OD≈0.9) was placed in the path of the excitation light to provide a wavelength-dependent attenuation of the excitation beam. The corresponding attenuations of the fluorescein emission intensity ($f_{theor}$), were estimated from Eqs. 1-3 using the spectral profile of the excitation light, pH-dependent fluorescein absorption (shown in FIG. 7E), and the excitation filter optical density. These values were found to differ significantly for three investigated pH levels, reflecting strongly varying OD($\lambda$) of Alexa488 dye in the excitation range. The predicted values of $f_{theor}$ ($f_1$=0.377, $f_2$=0.411, $f_3$=0.442) were corroborated by the experimental measurements of attenuation ratios $f_{exp}$ ($f_1$=0.381±0.010, $f_2$=0.41±0.005, $f_3$=0.438±0.012) resulting in readily distinguishable attenuation images for each buffer solution in FIG. 7B. The corresponding statistical distributions of $f_{exp}$ for each buffer are plotted in FIG. 7C. Based on the observed standard deviation of $f_{exp}$, we conclude that the pH level in the 5.5-6.5 range can be determined with a ~0.1 accuracy, which favorably compares to the average uncertainty resulting from FRET-based pH sensing measurements.

When imaging the cellular environment or other complex constructs, many entities can potentially contribute to shaping the excitation. In this case, the attenuation of excitation light by the environment of the dye could be measured separately in form of the absorption profile of dye-free samples. This procedure would also be applicable to any potential shaping of the excitation spectrum due to reflections, microscopy oil, interfaces, etc. The spectral profile in Eqs. 1 & 2 should then be replaced with a corrected one: $n_{exc}(\lambda) \rightarrow n_{exc}(\lambda) \times 10^{-A(\lambda)}$, where $A(\lambda)$ is the cumulative absorption of the dye environment.

In summary, we demonstrate the shaped-excitation fluorescence microscopy technique for distinguishing between multiple types of fluorescent molecules in an acquired image. The method's ability to distinguish multiple fluorescent targets is generally possible due to measurements of emission changes rather than the absolute emission, which represents a currently unexplored niche in the fluorescence microscopy. Along these lines, the present technique relies on spectral shaping of the excitation beam to induce predictable changes in the emission of targeted dyes, which are then accurately identified in the FL image based on respective attenuations of their emission intensities. The present method was demonstrated by identifying 8 CdSe quantum dot fluorophores with absorption features spanning the 522-623 nm range and was subsequently applied for detecting the pH balance in aqueous solutions with an average sensitivity of ~0.1. We expect that the present strategy would enable an increase in the number of fluorescent targets that could be simultaneously monitored within live cells using standard microcopy techniques.

In accordance with the provisions of the patent statutes, the present invention has been described in what is considered to represent its preferred embodiments. However, it should be noted that the invention can be practiced otherwise than as specifically illustrated and described without departing from its spirit or scope.

REFERENCES

[1] Lichtman J W and Denk W 2011 Science 334 618-623
[2] Giesen C, Wang H A, Schapiro D, Zivanovic N, Jacobs A, Hattendorf B, Schüffler P J, Grolimund D, Buhmann J M, Brandt S, Varga Z, Wild P J, Gunther D and Bodenmiller B 2014 Nat. Methods 11 417-422
[3] Shroff H, Galbraith C G, Galbraith J A, White H, Gillette J, Olenych S, Davidson M W and Betzig E 2007 Proc. Natl Acad. Science. USA 104 20308-20313
[4] Dickinson M. E, Bearman G, Tille S, Lansford R and Fraser S E 2001 Biotechniques 31 1272-1278
[5] Mahou P, Vermot J, Beaurepaire E and Supatto W 2014 Nat. Methods 11 600-601
[6] Wu M and Algar W R 2017 Anal. Chem. 87 8078-8083
[7] O'Rourke N A, Meyer T and Chandy G 2005 Curr. Opin. Chem. Biol. 9 82-87
[8] Nguyen A W and Daugherty P S 2005 Nat. Biotechnol. 23 355-360
[9] Medintz I L, Clapp A R, Mattoussi H, Goldman E R, Fisher B and Mauro J M Nat. Mater. 2, 630-638
[10] Jares-Erijman E A and Jovin T M Nat. Biotechnol. 21 1387-1395
[11] Truong K and Ikura M 2001 Curr. Opin. Struct. Biol. 11 573-578
[12] Guo Q, He Y and Lu H P 2015 Proc. Natl. Acad. Sci. U.S.A. 112 13904-13909
[13] Wang Z and Lu H P 2015 J. Phys. Chem. B. 119 6366-6378
[14] Lu M and Lu H P 2014 J. Phys. Chem. B. 118 11943-11955
[15] Lu H P 2014 Chem. Soc. Rev. 43 1118-1143
[16] Chen K H, Boettiger A N, Moffitt J R, Wang S and Zhuang X 2015 Science 348 6090
[17] Galperin E, Verkhusha V V and Sorkin A 2004 Nat. Methods 1 209-217
[18] Juette M F, Terry D S, Wasserman M R, Zhou Z, Altman R B, Zheng Q and Blanchard S C Curr Opin Chem Biol. 20 103-111
[19] Pollok B and Heim R 1999 Trends Cell Biol. 9 57-60
[20] Liu R, Hu D, Tan X and Lu H P 2006 J. Am. Chem. Soc. 128 10034-10042
[21] Qiang N and Jin Z 2010 Adv. Biochem. Engin./Biotechnol. 119 79-97
[22] He Y, Haque M M, Stuehr D J and Lu H P 2015 Proc. Natl. Acad. Sci. U. S. A. 112 11835-11840
[23] Tsurui H, Nishimura H, Hattori S, Hirose S, Okumura K and T Shirai 2000 J. Histochem. Cytochem. 48 653-662
[24] Wei L, Chen Z, Shi L, Long R, Anzalone A V, Zhang L, Hu F, Yuste R, Cornish V W and Min W Nature 544 465-470
[25] Dean K M and Palmer A E 2014 Nat. Chem. Biol. 10 512-523
[26] Carbone L, Nobile C, De Giorgi M, Della Salla F, Morello G, Pompa P, Hytch M, Snoeck E, Fiore A, Franchini I R, Nadasan M, Silvestre A F, Chiodo L, Kudera S, Cingolani R, Krahne R and Manna L 2007 Nano Lett. 7 2942-2950
[27] Peng Z A and Peng X G 2002 J. Am. Chem. Soc. 124 3343-3353
[28] Moroz P, Razgoniaeva N, He Y, Jensen G, Eckard H, Lu H P and Zamkov M 2017 ACS Nano 11 4191-4197
[29] Moroz P, Jin Z, Sugiyama Y, Lara D, Razgoniaeva N, Yang M, Kholmicheva N, Khon D, Mattoussi H and Zamkov M 2018 ACS Nano 12 5657-5665
[30] Andrews L M, Jones M R, Digman M A and Gratton E 2013 Biomed. Opt. Express 4 171-177
[31] Han J and Burgess K 2010 Chem. Rev. 110 2709-2728
[32] Nakamura A and Tsukiji S 2017 Bioorg. Med. Chem. Lett. 27 3127-3130
[33] Sjöback R, Nygren J and Kubista M 1995 Spectrochim. Acta, Part A 51 L7-L21
[34] Suzuki M, Husimi Y, Komatsu H, Suzuki K and Douglas K 2008 J. Am. Chem. Soc. 130 5720-5725
[35] Chen Y, Thakar R and Snee P T 2008 J. Am. Chem. Soc. 130 3744-3745
[36] Susumu K, Field L D, Oh E, Hunt M, Delehanty J B, Palomo V, Dawson P E, Huston A L and Medintz I L 2017 Chem. Mater. 29 7330-7344
[37] Cardone R A, Casavola V and Reshkin S J 2005 Nat. Rev. Cancer 5 786-795

What is claimed:

1. A method for detecting more than one fluorophore in a sample, the method comprising the steps of:
(a) providing a broad-spectrum excitation light for excitation of the more than one fluorophore in the sample,
(b) passing the broad-spectrum excitation light through a shaping filter, thereby producing a filtered excitation light,
wherein the shaping filter has an optical density that changes, the optical density changes based on a wavelength of the broad-spectrum excitation light, and the shaping filter is selected from the group consisting of: Cy dye and fluorescein dye, (c) illuminating the sample with the filtered excitation light, thereby exciting the more than one fluorophore in the sample and creating an emission light, and (d) detecting the emission light from the more than one fluorophore in the sample.

2. The method of claim 1, wherein the sample has a number of fluorophores selected from the group consisting of: two or more fluorophores, three or more fluorophores, four or more fluorophores, five or more fluorophores, six or more fluorophores, seven or more fluorophores, eight or more fluorophores, two to eight fluorophores, six to eight fluorophores, and eight fluorophores.

3. The method of claim 1, wherein the emission light from any given fluorophore varies in emission light intensity based on a variation in filtered light intensity.

4. The method of claim 3, wherein, the variation in filtered light intensity correlates to an optical density of the shaping filter at a given wavelength.

5. The method of claim 1, wherein, for any given fluorophore, an emission light intensity is measured with using the shaping filter, thereby creating a first measurement, and an emission light intensity is measured without using the shaping filter, thereby creating a second measurement, and a composition is made between the first and second measurements.

6. The method of claim 1, wherein any given fluorophore is detected by an attenuation of its emission light intensity due to the shaping filter.

7. The method of claim 1, wherein the fluorophore absorbs at wavelengths anywhere between 500 and 650 nm.

8. The method of claim 1, wherein the fluorophore is selected from the group consisting of: CdSe and fluorescein.

9. A method for detecting more than one fluorophore in a sample, the method comprising the steps of:

(a) providing a broad-spectrum excitation light for excitation of the more than one fluorophore in the sample, (b) passing the broad-spectrum excitation light through a shaping filter, thereby producing a filtered excitation light, (c) illuminating the sample with the filtered excitation light, thereby exciting the more than one fluorophore in the sample and creating an emission light, and (d) detecting the emission light from the more than one fluorophore in the sample, wherein, for any given fluorophore, an emission light intensity is measured with using the shaping filter, thereby creating a first measurement, and an emission light intensity is measured without using the shaping filter, thereby creating a second measurement, and a composition is made between the first and second measurements.

* * * * *